Feb. 27, 1951 J. R. WARNE 2,543,427
COMBINED MEDICINE BOTTLE CAP AND MEASURING CUP
Filed June 23, 1948
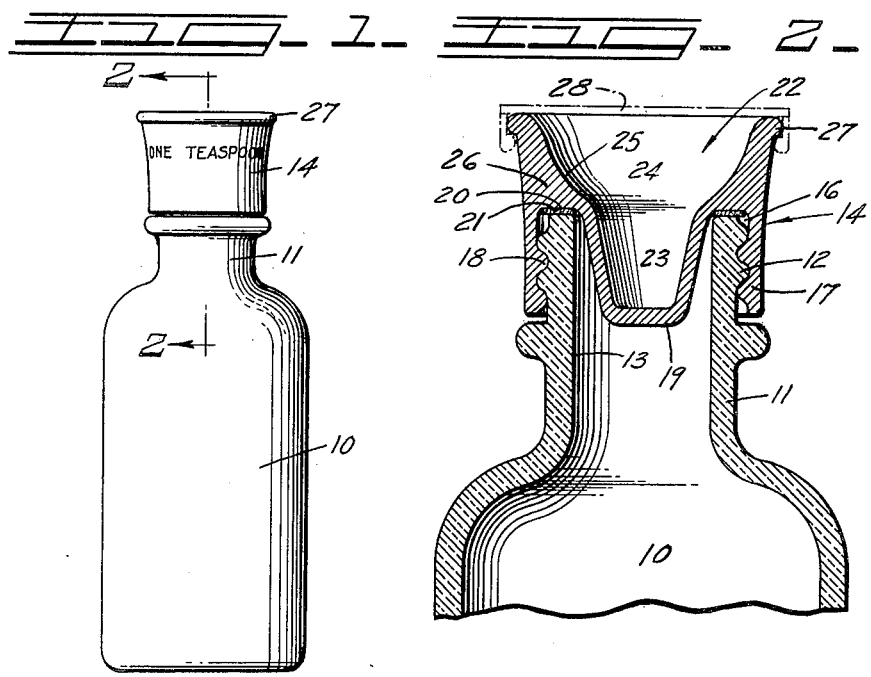
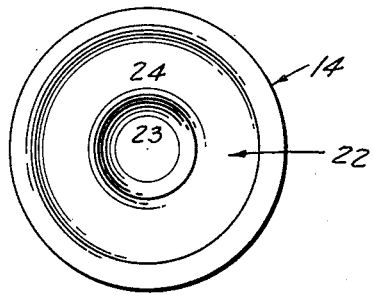
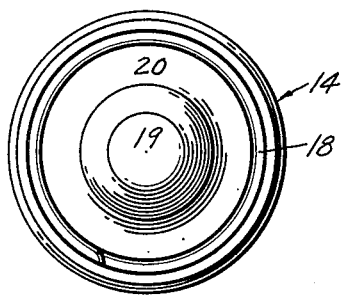
Inventor
Joseph R. Warne
By H. B. Willson & Co.
Attorneys Patented Feb. 27, 1951

2,543,427

UNITED STATES PATENT OFFICE 2,543,427

COMBINED MEDICINE BOTTLE CAP AND MEASURING CUP

Joseph R. Warne, Pottsville, Pa.

Application June 23, 1948, Serial No. 34,654

2 Claims. (Cl. 222—115)

Many proprietary liquid medicines are sold in small-sized bottles and usually the dose is stated to be one or more teaspoons. Again physicians, in writing prescriptions calling for medicines in liquid form, frequently prescribe an amount requiring the use of a small bottle and specify the dose as one or more teaspoons. When such medicines are to be used, it happens often that there is no teaspoon handy for measuring the required dose. Therefore, the principal object of my invention is to save people the inconvenience if looking for a teaspoon every time they take medicine from such bottles which usually have small necks; and that object is accomplished by forming the top and interior of closure cap with a measuring chamber or cup that will just hold a medicinal teaspoon of the liquid medicine.

While it has been proposed to provide a measuring cup or glass as an integral or unitary part of a bottle cap or similar closure, none to my knowledge has been of suitable construction for a small medicine bottle having a narrow neck. In some of the prior art, combined bottle caps and measuring cups, the measuring cup has projected entirely above the top of the cap, while in others it has projected partly into the neck of the bottle. While such structures are suitable for large bottles with wide necks, they cannot be adapted to small neck bottles and have the desired measuring capacity, without the top of the device projecting so far above the top of the bottle that the design is thrown out of proportion and the capped bottle is liable to be easily overturned.

In carrying out my invention, I mold the device in one piece making the height of the entire device only about twice the height of the usual screw cap for a small bottle and I make the top of the measuring cup substantially the full width of the cap, extending the bottom of the cup down into the neck of the bottle when the device is applied to the latter. I am thus enabled to obtain a measuring chamber or cavity that will hold a medicinal teaspoon full of liquid in a closure cap that is relatively low in height, well proportioned and attractive in appearance. At the same time the device has a large top opening into which the liquid may be readily poured from the bottle, and there is no likelihood of the liquid, if thick or sticky, getting on the screw threads when the liquid is poured into the cup.

One object is to provide a device that is easy to use and clean, and one which is simple to manufacture and may be sold at a low price.

Other objects and advantages of the invention will become apparent from the following description and the accompanying drawing in which:

Figure 1 is a full size side view of the device in place on a small narrow-mouth medicine bottle.

Fig. 2 is an enlarged section taken on line 2—2 of Fig. 1.

Fig. 3 is a top plan view of the cap removed from the bottle.

Fig. 4 is a bottom plan view of the device.

Referring to the drawing, the numeral 10 denotes a small narrow-mouth medicine bottle holding about three ounces and having a neck 11 provided with external screw threads 12 or the like. The interior 13 of the neck provides a relatively small filling and discharging opening for the bottle.

My improved combined closure cap and measuring cup is preferably molded in one piece of one of the modern plastic materials, although it may be made of glass, Celluloid, Bakelite or metal. It comprises a body 14 of cylindrical shape and having a height approximately twice the height of the usual small medicine bottle cap. In the lower half of the body is formed a concentric cylindrical recess 16 to provide a depending annular flange 17. On the inner wall of this flange are formed screw threads or the like 18 for engagement with the threads 12. Disposed opposite and within the flange 17 is an inverted frusto-conical shaped projection 19, the latter being concentric with said flange and forming in connection therewith an annular chamber on the bottom 20 of which may be placed a sealing ring or gasket 21 to be engaged by the upper edge of the bottle neck when the device is screwed down upon the neck.

In the body is formed a measuring cavity or chamber 22 which extends the full height of the body as shown in Fig. 2. The lower half 23 of this cup or cavity is formed in the projection 19 and, hence, is frusto-conical in shape, while the upper half 24 is much larger and has its open top substantially coextensive in area with the top of the body. The upper half of the cavity preferably has its continuous wall 25 curved upwardly and outwardly from the top of the conical lower half 23 of the cavity to the upper edge of the top of the body. This provides the chambered upper half of the body with a thick wall and a thick portion 26 joining the flange 17 with the depending projection 19 and, hence, produces a strong construction which will not be easily cracked or broken.

If desired, the outer side of the body may be slightly flared outwardly and upwardly and its upper edge may be formed with an annular head 27 over which a removable cover may be snapped. Such a cover is shown in dotted lines 28 in Fig. 2 and may be used to protect the interior of the measuring cup from dust and dirt when the device is not being used.

The improved device is primarily for small medicine bottles and the cup or cavity 22 is of a size to hold one medicinal teaspoon of liquid. On the side of the body 14 may be molded or stamped "One teaspoon" as shown in Fig. 1. By flaring the top or upper portion of the device outwardly as above indicated and making the upper part 24 of the measuring chamber wider, the measuring capacity of the device may be increased slightly beyond a single teaspoon without increasing the total height of the device. By making the lower part of the measuring cavity extend into the cap and, hence, into the bottle neck and by making the upper part of the cavity much wider than the mouth of the bottle, I obtain a cap low in height with a measuring cavity that will hold a teaspoonful of liquid so that the cap may be used on a bottle holding only a few ounces. It will be noted that the device is easy to clean, strong in construction, and may be manufactured at a small cost. It will also enhance the appearance of the bottle. The cavity or cup having a wide open top makes it easier to fill and there is no likelihood of the liquid, if thick or sticky, getting into the annular recess and jamming the screw threads.

While the preferred construction has been shown and described, it will be understood that minor changes may be made within the spirit and scope of the invention as claimed.

I claim:

1. A combined closure cap and measuring cup for application to the screw-threaded neck of a medicine bottle comprising a one-piece body of generally cylindrical shape from top to bottom, the lower half of said body having an annular recess opening through its bottom and providing an internally screw-threaded flange for engagement with the threads on the neck of a bottle and a central hollow projection disposed within said flange, said body having a measuring-cup cavity extending from its top to its bottom and opening through the top of the body, the lower half of said cavity being reduced in size and disposed in said projection and the upper half of said cavity being enlarged and having its upper open end substantially coextensive in area with the top of said body.

2. A combined closure cap and measuring cup device for application to the small screw-threaded neck of a medicine bottle holding only a few fluid ounces, said device being molded in one piece and comprising a body of cylindrical shape having upwardly open measuring-cup cavity extending the full height of said body and of a size to hold only a medicinal teaspoonful of the contents of the bottle, the lower half of said body having a cylindrical recess opening through its bottom and providing an internally screw-threaded flange for engagement with the threads on the neck of the bottle, the lower half of said body also having a hollow inverted frusto-conical shaped projection disposed concentrically in said cylindrical recess and adapted to be positioned within the neck of the bottle when the device is screwed on the bottle neck, the interior of said projection forming the lower half of said cavity and having a flat bottom disposed in the plane of the lower edge of said flange, the upper half of said body being hollow to form the open upper half of said measuring cavity and having an inner wall curved upwardly and outwardly from the top of the interior of said projection to the top of the cylindrical outer surface of said body to provide said measuring cavity with an open top coextensive in area with the upper end of said body.

JOSEPH R. WARNE.

REFERENCES CITED

The following references are of record in the file of this patent:

UNITED STATES PATENTS

| Number | Name | Date |
| --- | --- | --- |
| 2,061,685 | Wheaton | Nov. 24, 1936 |
| 2,076,457 | Genone | Apr. 6, 1937 |